US006829341B2

(12) United States Patent
Contreras

(10) Patent No.: US 6,829,341 B2
(45) Date of Patent: Dec. 7, 2004

(54) METHOD FOR MANAGING A PLURALITY OF EXTENSION COMMUNICATION UNITS

(75) Inventor: Elizabeth Sotelo Contreras, Saltillo (MX)

(73) Assignee: Telefonaktiebolaget LM Ericsson, Stockholm (SE)

( * ) Notice: Subject to any disclaimer, the term of this patent is extended or adjusted under 35 U.S.C. 154(b) by 406 days.

(21) Appl. No.: 09/814,031

(22) Filed: Mar. 21, 2001

(65) Prior Publication Data

US 2002/0136383 A1 Sep. 26, 2002

(51) Int. Cl.[7] ............................................... H04M 3/20
(52) U.S. Cl. ..................................... 379/177; 455/445
(58) Field of Search ....................... 379/211.01, 211.02, 379/211.03, 211.04, 113, 127.01, 67.1, 88.15, 93.35, 142.08, 156–158, 177–179, 182–183; 455/445, 456.1, 426.1, 414.1, 414.2, 417, 458, 459; 340/7.2, 7.26, 7.27

(56) References Cited

U.S. PATENT DOCUMENTS 5,206,901 A * 4/1993 Harlow et al. ......... 379/211.04
5,675,629 A * 10/1997 Raffel et al. ............. 455/552.1
5,699,407 A    12/1997 Nguyen
5,752,191 A *  5/1998 Fuller et al. ................. 455/445
5,884,167 A *  3/1999 Carlsen et al. ........... 455/432.1
6,263,071 B1 *  7/2001 Swan et al. ................. 379/372
6,411,682 B1 *  6/2002 Fuller et al. ............... 379/67.1
6,556,823 B2 *  4/2003 Clapton et al. ............. 455/433

FOREIGN PATENT DOCUMENTS

WO        WO 94/17644        4/1994

* cited by examiner

Primary Examiner—Fan Tsang
Assistant Examiner—Ming Chow

(57) ABSTRACT

A method for establishing call connections with a plurality of extension communication units in a cellular communication is disclosed. A subscriber telephone number directory identifies a number of extension communication units assigned to receive a call. Each of said extension communication units further include a list of subscriber numbers from which said extension communication unit wishes to receive call connections. A conference call decision process allows the subscribers to then determine who will take the call. All subscribers have the same priority for answering the call and minimum resources are utilized to reach the correct extension communication unit. Conference call connections with multiple extension communication units are further provided.

8 Claims, 7 Drawing Sheets

METHOD FOR MANAGING A PLURALITY OF EXTENSION COMMUNICATION UNITS

BACKGROUND OF THE INVENTION

1. Technical Field

This invention relates generally to methods for managing telephone calls to multiple extensions. More particularly, the invention relates to a method for managing telephone calls to a plurality of extension communication units through the use of directories to reach the correct extension.

2. History of Related Art

Currently, methods for providing extension management services within a mobile radio telephone communication system include systems that determine which telephone receives a call based on a predefined priority protocol assigned to each extension communication unit, which is typically a cellular telephone or some other type of mobile station. The priority is based upon the first subscriber to answer the call, the extension communication unit closest to the calling party, or the extension communication unit with the highest assigned priority (see, generally, FIG. 1).

In such prior art systems, a call directed to a single subscriber number is received at a gateway MSC, which in turn sends a location request message to an associated HLR. In response to the location request message, the HLR transmits an individual routing request message to each one of the plurality of identified MSC's serving extension communication units associated with the subscriber number. In turn, each one of the MSC's receiving a routing request message pages each one of the assigned extension communication units within its service area. A voice channel is established between any responding extension communication units and its corresponding paging MSC. Each responding extension communication unit is alerted, preferably with a distinctive ring, so that the associated subscriber knows that this is an extension communication unit call.

If a subscriber is present and answers the call, then the answering subscriber is put on hold while the corresponding MSC returns the result to the associated HLR. If more than one MSC returns a result to the HLR (indicating that more than one subscriber answered the call), then the HLR selects a single subscriber to complete the call, based on one of the three possible predetermined criteria described above. Following delivery of the call, the HLR releases all of the answering extension communication units that were not selected by the HLR to receive the call.

Several problems exist with this type of system. The call might be routed to the wrong extension communication unit due to the use of a non-current, predefined priority table, so that the person making the call has to call again or leave a message. Also, when the call is completed by one of the extension communication units, other extensions associated with the subscriber number will not receive a chance to participate in the call because its transmission to them is cancelled by the system. Thus, this system does not allow all of the subscribers having extension communication units associated with the same subscriber number to have the same priority for answering a call.

What is needed, therefore, is a method of managing a plurality of extension communication units which ensures that a call reaches the proper mobile extension. More particularly, what is needed is a method which primarily utilizes a current directory to identify those extension communication units which will receive the call and secondarily utilizes a conference call decision-making process allowing the subscribers, rather than the system, to determine who will take the call. The method should permit all of the subscribers to have the same priority for answering a call. Finally, the method should utilize the minimum amount of system resources necessary in order to route the call to the correct extension communication unit without the necessity of additional calls and/or messages being made.

SUMMARY OF THE INVENTION

The present invention includes a method for managing a plurality of mobile extension communication units using a directory and a conference call decision-making process. In this method, a location request message associated with a call to a subscriber number is received. A determination is made as to whether more than one mobile identification number (MIN) is associated with the subscriber number to which the call is directed. If not, the call is delivered to the mobile station corresponding to the MIN assigned to the subscriber number to which the call is directed. If so, a determination is made as to whether the Calling Party Number is included in the telephone directory corresponding to each of the MINs associated with the subscriber number. If the Calling Party Number is not included in a telephone directory corresponding to any of the MINs, the call is routed to all of the extension communication units. If the Calling Party Number is included in the telephone directory corresponding to only one of the MIN's, then the call is delivered to the extension communication unit associated with that MIN. If the Calling Party Number is included in the telephone directories corresponding to two or more MIN's, then the call is routed to those specific extension communication units. The Home Location Register (HLR) sends the routing request message for each MIN to the appropriate VLR/MSC, and the VLR/MSC pages each of the MIN's. The HLR waits until all responses have been received. If there are no responses, the HLR initiates its recovery procedure and finishes the call. If there is at least one response, the call is delivered to the responding extension communication unit, while the HLR continues to collect all the routing numbers (TLDN's) from each extension and send them to the GMSC in a location request return result response. A conference call countdown timer in the GMSC is initiated and all extensions not responding within the allotted time are released. Each extension answering within the allotted time is included in a conference call (assuming more than one extension answers). If another extension has already answered the call and activated a selected function code, other extensions which have answered, or subsequently answering the call, will be canceled and released. Thus, multiple extensions may respond at different points within the allotted conference call answering response time to join a conference call. Once the time limit has passed, it is no longer possible for the non-answering extensions to join the conference call. An additional feature includes a change in the ring tone after one extension has answered the call in order to alert remaining extensions that the call has been answered by at least one extension.

In another embodiment of the invention, a node in electronic communication with the plurality of extension communication units includes a response reception module for receiving paging and answering responses from the extensions, and a conference call answering response timer in electronic communication with the response reception module. The node is in electronic communication with a HLR, which includes a paging response timer. Another embodiment of the invention includes an extension communication unit management system having a plurality of extension communication units in electronic communication with the node.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
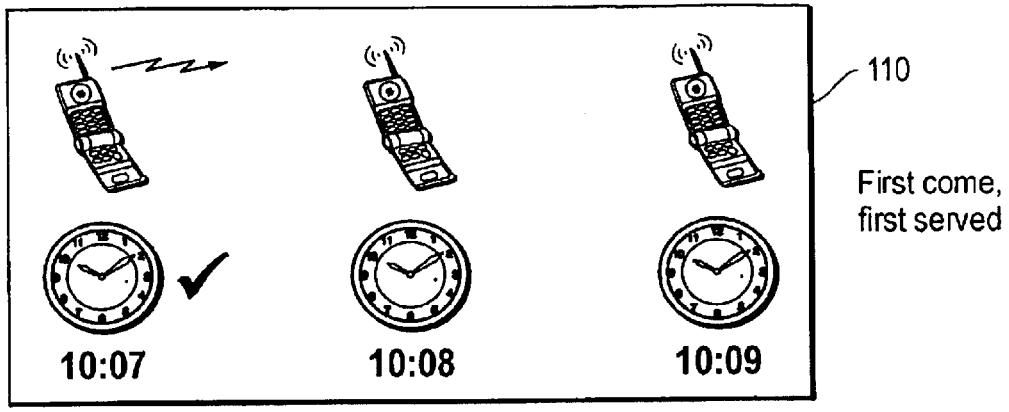
FIG. 1 is a prior art pictorial representation of predetermined criteria utilized to determine which subscriber out of several associated with a single subscriber number completes a call.
Figure 1:
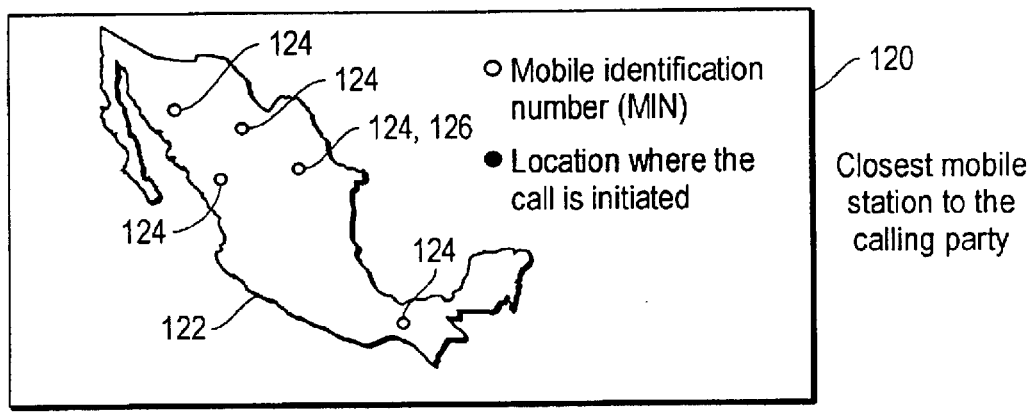
Figure 1:
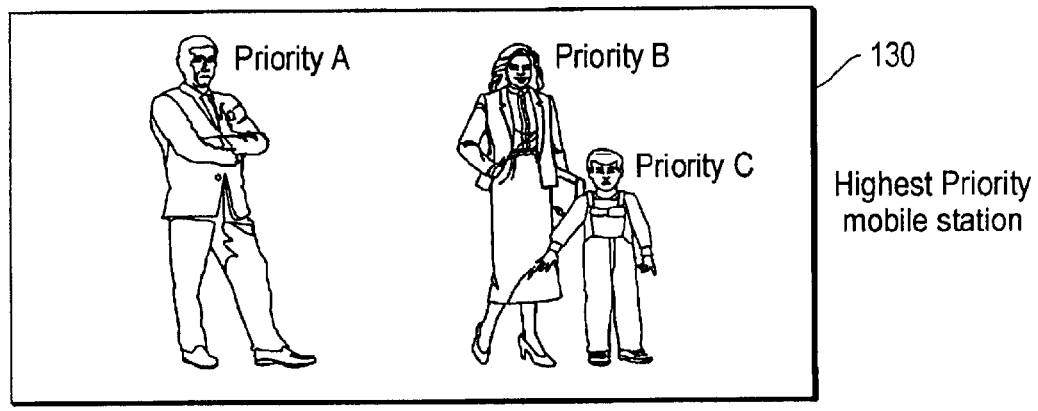

As shown in FIG. 1, the method utilized in the prior art for routing a telephone call within a multiple cellular extension system is based on one of three possible predetermined criteria. Assuming that a single dialed number is associated with multiple MINs/extension communication units, the call may be routed and delivered to the first subscriber to answer the call 110. Alternatively, the call may be routed according to geographic proximity 120, such that the call is routed to the MIN of the extension communication unit located closest to the calling party. This can be accomplished by calculating the distance between the interrogation exchange 122 and the visited mobile switching center 124 currently serving an extension communication unit whose MIN is associated with the dialed number. The call is delivered to the extension communication unit 126 associated with the MIN closest to the calling party. Lastly, the call may be routed according to the priorities 130 assigned to the MIN's associated with various extension communication units. In this case, the system arranges the responses in priority order and delivers the call to the extension communication unit associated with the MIN having the highest priority.

Figure 2A:
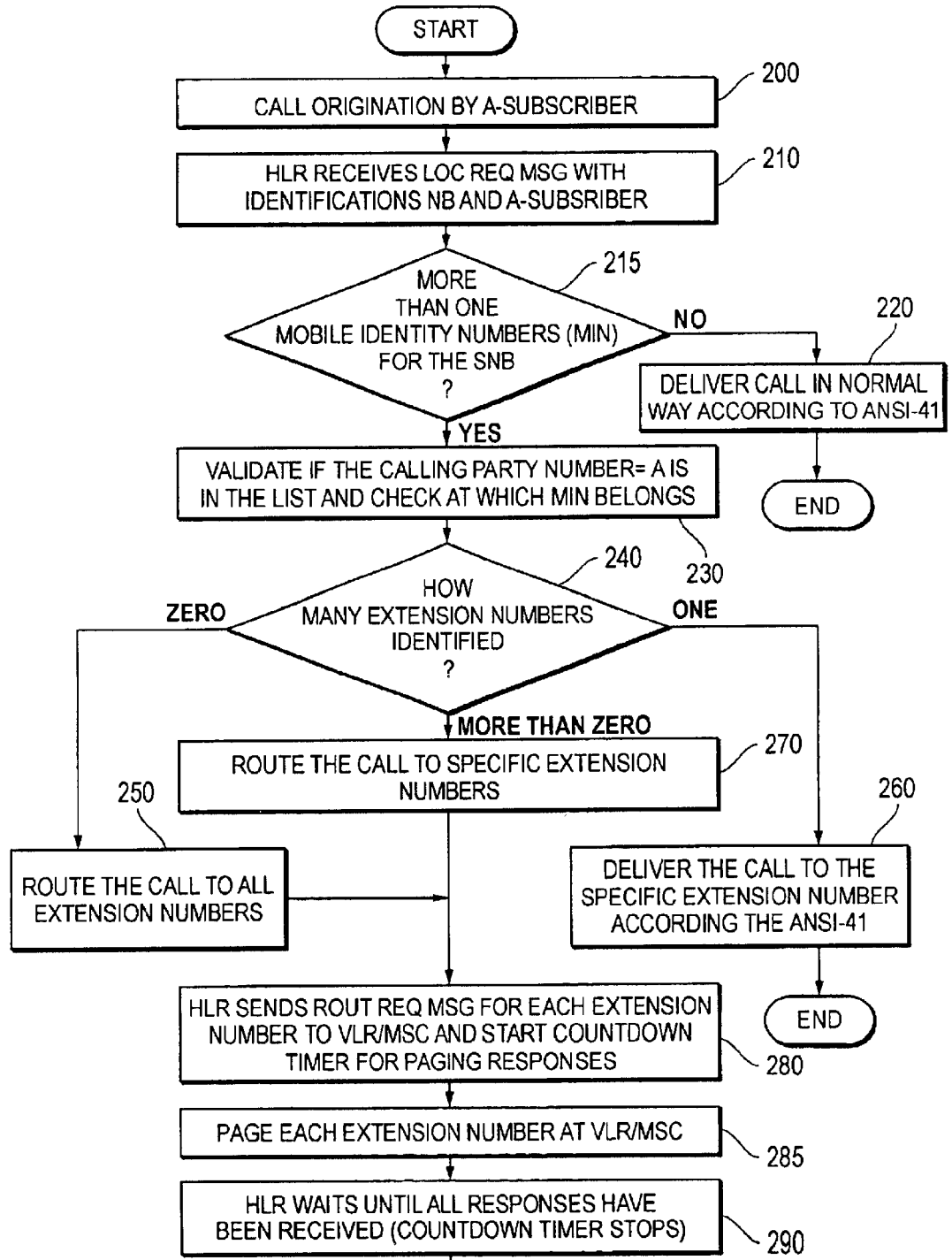
FIGS. 2A and 2B are flow chart diagrams illustrating the method of operating the multiple extension unit system of the present invention.
Figure 2B:
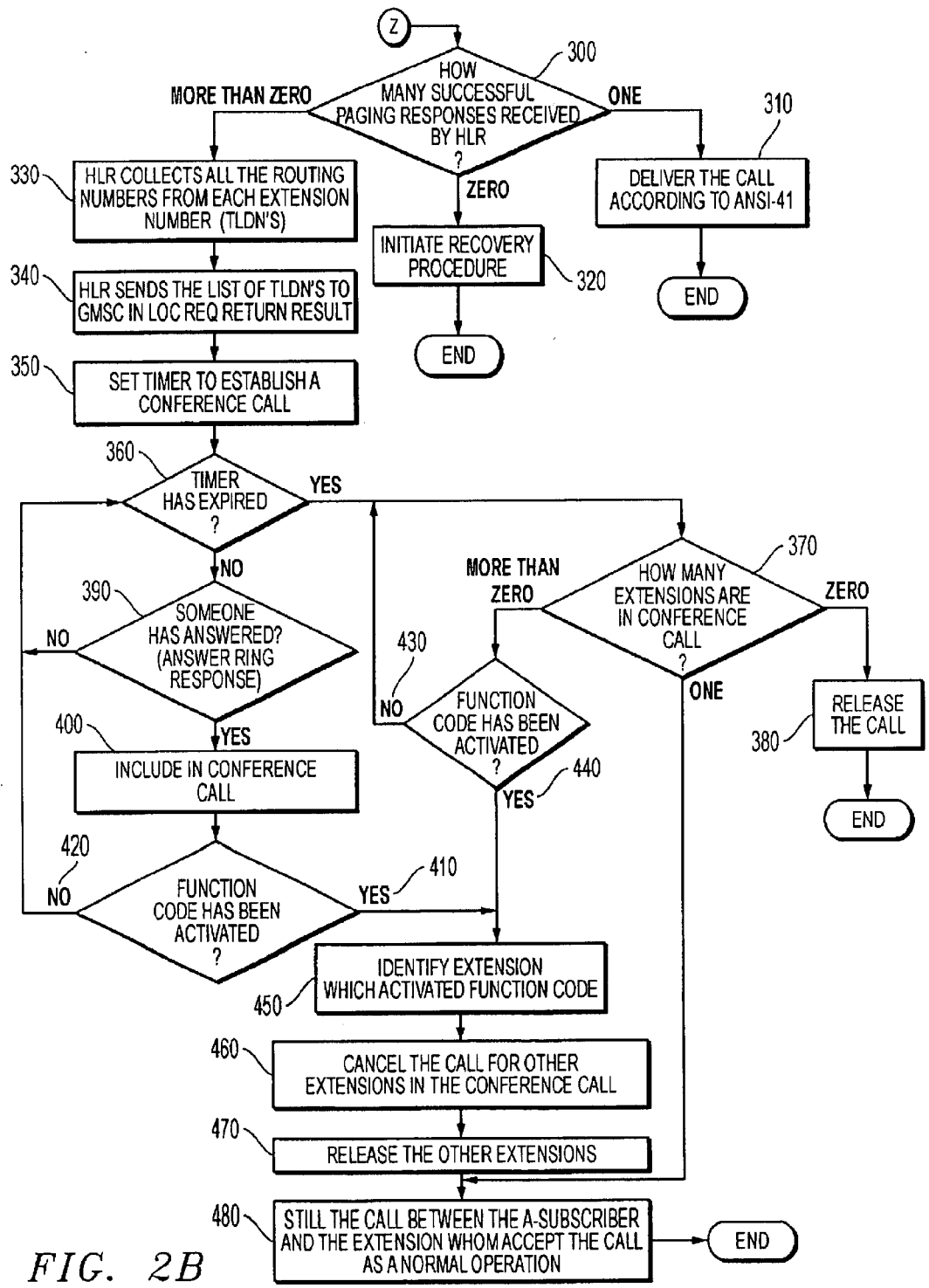

The many problems previously described with respect to the prior art are addressed and solved by the Applicant's invention. As shown in FIGS. 2A and 2B, the method of the invention starts with a call origination made by a calling subscriber in step 200. A location request message regarding a call dialed to a subscriber number (SNB) is received in step 210. A determination is made as to whether more than one MIN is associated with the identified subscriber number in step 215. If not, the method continues in step 220, wherein the call is delivered to the mobile station corresponding to the MIN associated with the subscriber number in accordance with the procedure specified in the Telecommunication Industry Association American National Standards Institute (TIA ANSI-41) standard, for example, and then continues to end the call. If more than one MIN is associated with the subscriber number to which the call is directed, the method continues in step 230, wherein a determination is made as to whether the calling party number is in the list (telephone directory) of each extension unit associated with the MINs. Depending on the number of lists in which the calling party number appears, several call delivery scenarios may arise. For example, if the calling party number belongs to any of the lists or directories as determined in step 240, the MINs containing the calling party number are identified. However, if the calling party number is not included in any of the MIN list directories, then the call is routed to all MINs in step 250. Finally, if the calling party number is included in the telephone directory of only one MIN, then the call is delivered to the MSC associated with that MIN and telephone directory, and is directed in accordance with the procedure specified in TIA ANSI-41, for example, in step 260. If the calling party number is included in the telephone directories of two or more MINs, the call is routed to those MINs in step 270. The HLR then sends the routing request message for each MIN to the appropriate VLR/MSC in step 280. The HLR starts the paging response countdown timer. The appropriate VLR/MSC's serving the extension communication units associated with the identified MINs then send a page request to each MIN in step 285. The HLR waits until all routing request paging responses have been received from the VLR/MSC's 290 (within the constraints of the countdown timer operation).

Continuing in FIG. 2B, the number of paging responses received successfully by the HLR from the MSCs is noted in step 300. The next step in the method varies depending on the number of responses received by the HLR. If one paging response is received, the call is delivered to the responding extension communication unit according to the ANSI-41 procedure, for example, in step 310. If no page responses are received, the HLR initiates its recovery procedure (well known to those skilled in the art) and the call is ended in step 320. If more than one paging response is received, the HLR collects all the routing numbers for each MIN (i.e., the TLDNs for the responding extension communication units) in step 330. The HLR then sends the list of TLDNs to the GMSC in a location request return result response in step 340. A conference call countdown timer within the GMSC is initiated to establish a conference call in step 350. If the conference call timer expires in step 360 before any "off hook" responses are received, the subscribers that did not respond are released in step 370, and the call is ended in step 380.

If the conference call countdown timer has not expired and there is at least one "off hook" response (i.e., an extension communication unit answers) in step 390, the answering extension communication unit is included in the conference call in step 400. If a selected function code has been activated in step 410 to indicate that a single responding extension is to take the call, the extension is identified in step 450 and the call is cancelled for all other extensions in the conference call in step 460, the other extensions are released in step 470, and the call is held between the extension which selected the function code and the A-subscriber in step 480. If the selected function code has not been activated by one of the responding extensions in step 420, the method continues until the timer expires in step 360, or the selected function code is activated in step 410. The responses may, of course, occur at different times to make the conference call. After one extension communication unit answers (i.e., is taken "off hook"), the ring may change to signal to the other (non-responding) extension communication units that the call has been answered. If the conference call timer has expired or the selected function code has been activated, it will not be possible for the other extensions to be included in the conference call.

If the conference call answering response countdown timer expires in step 360, the next step in the method varies depending on the number of extensions involved in the conference call (step 370). If one extension is in the call, the call is still in progress between the A-subscriber and the single extension which answered in response to the ringing and took the call (step 480), and the method ends. If no extensions are in conference call, the call is ended in step 380. If more than one extension is in the conference call, and the selection function code has not been activated by one of the responding extensions in step 430, the method continues until only one or none extensions are in the conference call, or the selected function code is activated in step 440. Otherwise, if the selected function code is activated in step 440, the activating extension selecting the function code is identified in step 450 and the call is cancelled for all other (non-answering) extensions in the conference call in step 460, such that the other extensions are released in step 470, and the call is in progress between the A-subscriber and the single extension which activated the function code in step 410.

Figure 3:
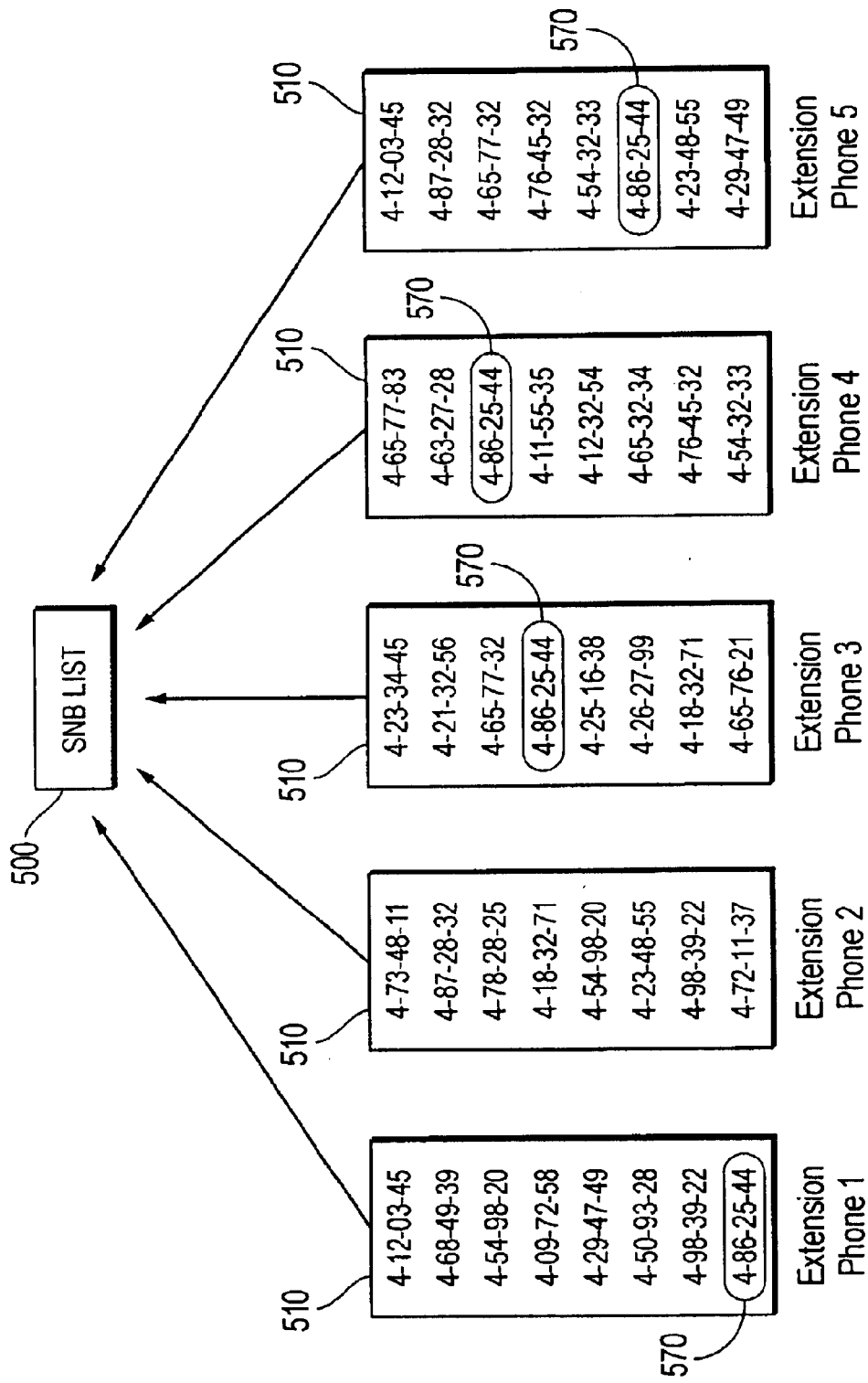
FIG. 3 is a chart depicting a possible structure for the telephone directory of the present invention.

FIG. 3 illustrates one possible implementation of a structure for telephone list directories included in extension communication units. Each subscriber number (i.e., calling party number) is associated with a telephone number extension list (SNB list) 500, which contains the calling telephone number lists 510 for each of the extensions. When a call is received, each list is checked for the calling party number 570 in order to route and deliver the call to the correct extension communication units. When the calling party number 570 is located on the telephone number lists of two or more extension communication units, the call is routed to each of these extensions. The decision as to who will take the call is thus directed by the extension calling party list content, instead of by a non-current, fully-automated system, as in the prior art. Furthermore, each extension is independent, and therefore, any extension can make a call at any time, even when another extension is in use.

Figure 4:
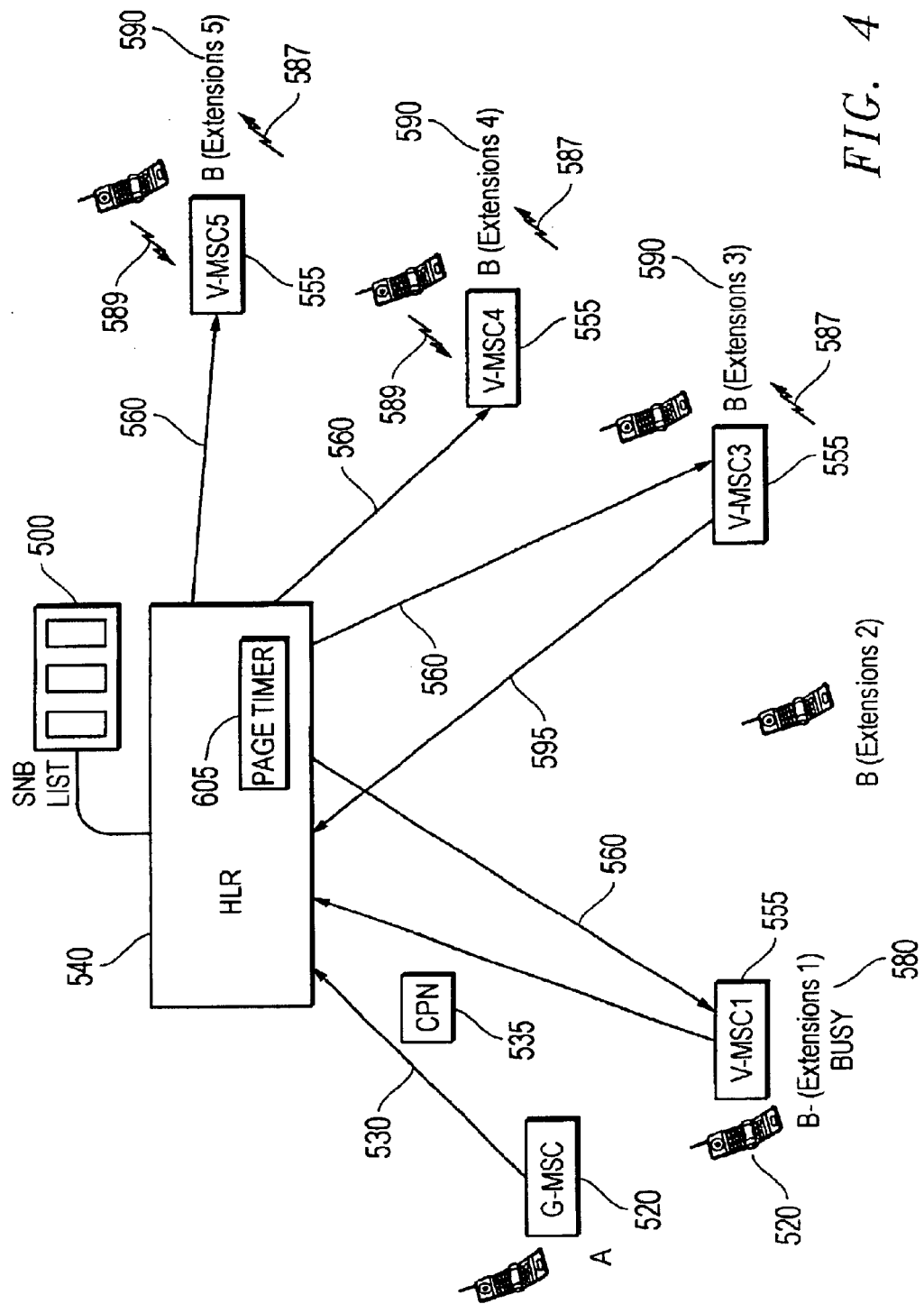
FIG. 4 is an event flow diagram illustrating the method of the present invention wherein the telephone number identified is included in the directory lists corresponding to two or more MIN's.

FIG. 4 illustrates the method of the present invention as it operates when the calling party telephone number is included in the directory list of two or more extensions. The G-MSC 520 of the calling party telephone A sends a location request message 530 including the calling party number 535 to the HLR 540. The HLR 540 checks the SNB list 500 (described above in FIG. 3) to determine which extensions 550 contain the calling party number in their telephone number directory. Next, the routing request message 560 is routed to all V-MSCs 555 which match the identified calling party number 535 and the paging countdown timer 605 is started while the HLR 540 waits for a response from each V-MSC 555. For example, in FIG. 4, the calling party telephone number is 4-86-25-44 (570). As illustrated in FIG. 3, that calling party number 570 is included in the telephone directory list for extension communication units (or "extensions") 1, 3, 4, and 5. It is not in the telephone directory list for extension communication unit 2 (or "extension 2"). Therefore, as shown in FIG. 4, extension 2 is not sent the routing request message 560. If one of the extensions is busy 580, then that extension notifies the HLR 540 of the busy condition 585 and the calling process for that extension is terminated. If a V-MSC 555 has one or more non-busy extensions 590, then the V-MSC sends out paging signals 587 to those extensions 590. If there is no page response 589 from an extension, then the associated V-MSC 555 notifies the HLR 540 of the non-responding condition, and the calling process for that extension is terminated. For example, in FIG. 4, extension 3 is not responding to the page, and the V-MSC 555 notifies the HLR 540 in step 595 of the non-responding condition. Thus, the calling process for that extension will be terminated. Thus, all of the V-MSCs 555 may be terminated from the calling process if all the paged extensions are busy or are not responding.

Figure 5:
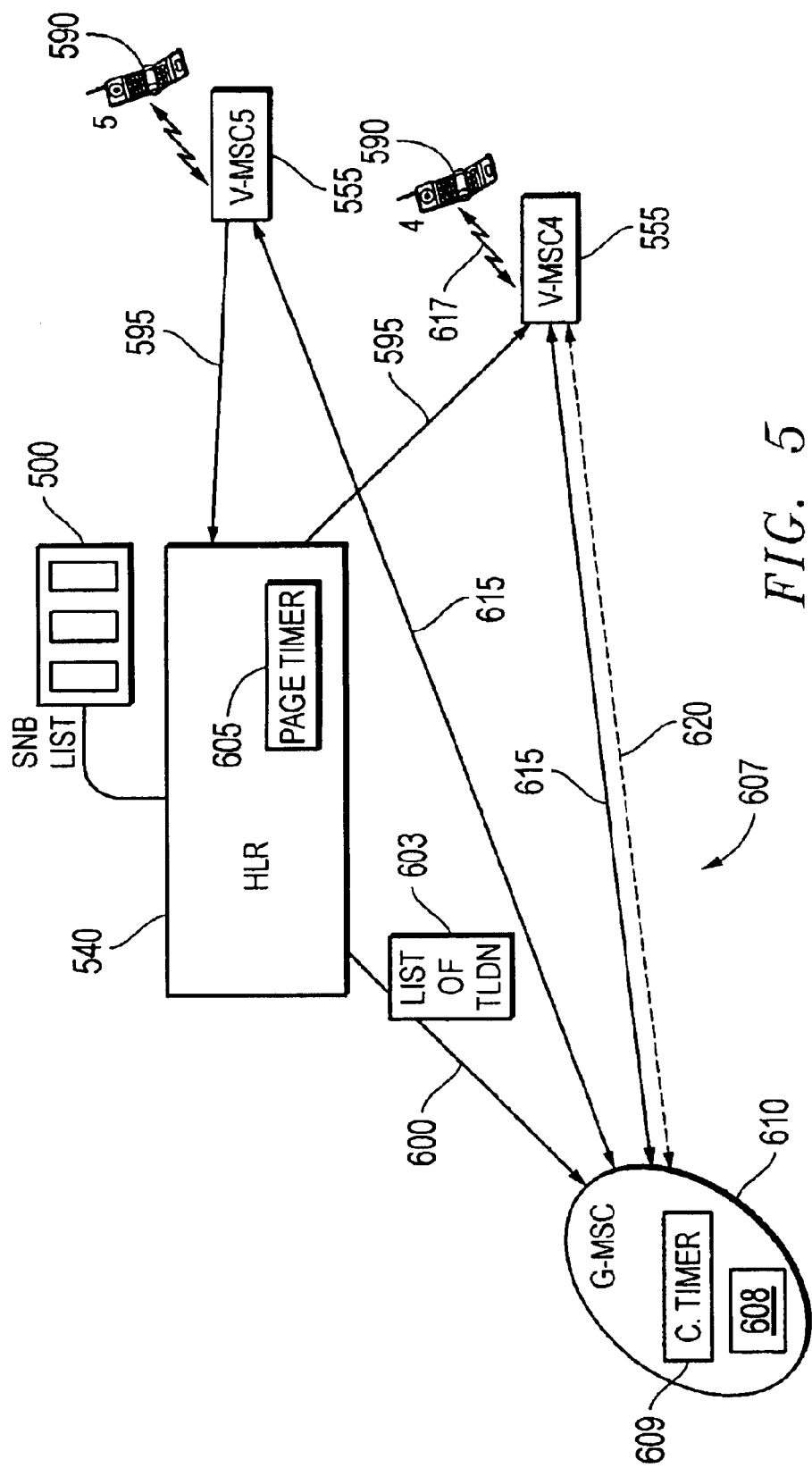
FIG. 5 is an event flow diagram illustrating the method of the present invention after paging messages have been sent to a plurality of mobile stations.

FIG. 5 illustrates the method of the present invention after paging messages have been sent to the plurality of extension communication units of FIG. 4. The V-MSC4 and VMSC-5 send the routing request return result messages to the HLR 540 in step 595, including the respective TLDNs for each extension. The HLR 540 stops the paging countdown timer 605 and sends the location request return result message 600, including the list of TLDNs 603, to the G-MSC node 610. In this moment, the G-MSC starts the conference countdown timer 609 and performs the call set up in step 615 for each mobile extension 590. The subscribers operating an extension associated with, for example, V-MSC4 and V-MSC5 may answer the call in response to a ringing tone in step 615. The extension in communication with V-MSC4 could answer at a different time within the allotted time limit of response (i.e., the conference countdown timer 609) than the extension in communication with V-MSC5, for example. However, if each extension (i.e., the extension communication units communicating with V-MSC4 and V-MSC5) answers the call within the conference countdown timer allotted timeout period, then the conference call is made between the G-MSC, the V-MSC4, and the V-MSC5, and, assuming that the extensions communicating with V-MSC4 and V-MSC5 are taken off-hook prior to the expiration of the countdown time period for the conference call timer 609, the decision as to who will take the call is made at the G-MSC 610. If, for example, the subscriber operating the extension communicating with the V-MSC4 elects to take the call, then the subscriber taking the call can press a button to activate a selected function code 617, releasing the other answering extension (communicating with the V-MSC5) and terminating that connection as shown in step 620.

Thus, in another embodiment of the invention, a node 610 in electronic communication with the plurality of extension communication units 590 includes a response reception module 608 for answering responses from the extensions 590 and a conference call answering response timer 609. The response reception module may be implemented as a hardware module, or as a software program module. The node 610 is in electronic communication with an HLR 540, which in turn includes a paging response timer 605. Another embodiment of the invention includes an extension communication unit management system 607 having a plurality of extension communication units 590 in electronic communication with the node 610.

Figure 6:
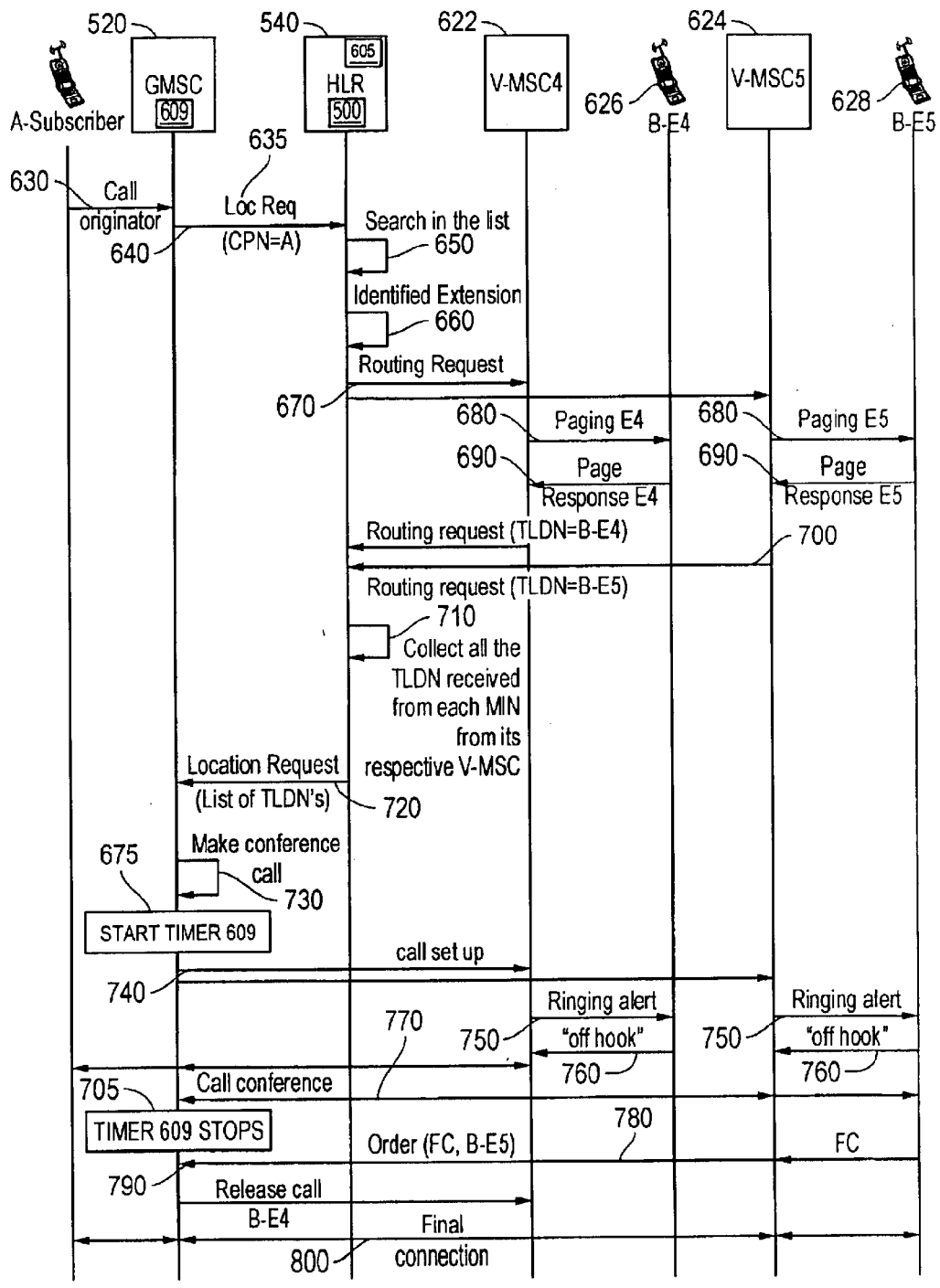
FIG. 6 is a message flow diagram illustrating an exemplary embodiment of the method of the present invention.

FIG. 6 illustrates an exemplary embodiment of the method of the present invention. A subscriber originates the call in step 630. The location request (CPN=A) message 635 is sent to the HLR in step 640. The calling party number A is searched in the telephone directory list 500 associated with the extensions 626, 628 in step 650. The calling party number A is identified in the list 500 in step 660. The routing request is made by the HLR to the V-MSCs that have the number of the A subscriber, for example, to the V-MSC4 622 and V-MSC5 624 in step 670. Then, the V-MSCs 622, 624 page the extensions 626, 628 in step 680. Each extension 626, 628 responds with a paging response to the page in step 690 (prior to expiration of the paging timer 605). A routing request response from the TLDN=B, i.e., for extensions 626, 628, is sent to the HLR 540 in step 700. The HLR 540 collects all the TLDNs received for each MIN associated with the extensions 626, 628 from its respective V-MSC 622, 624 in step 710. Then, the location request response (including the TLDNs) is made to the GMSC 520 in step 720. The GMSC then operates to make the conference call in step 730, the answering response timer 609 begins to count down in step 675, and the call is set up in step 740. The ringing alert is sent by the V-MSCs 622, 624 to the respective extensions 626, 628 in step 750, and the answering extensions 626, 628 are taken "off-hook" as an answering response in step 760 (prior to expiration of the conference timer 609). The subscribers of terminating extensions 626, 628, for example, may answer the call in response to the regular ringing tone in step 690 any time within the time limit of response after the timer 609 starts to count down in step 675, and finishes counting down in step 705, and the conference call is made at that moment if all extensions 626, 628 respond (rather than waiting for the end of countdown of timer 609). A special ring tone may be asserted to the remaining extensions after the first extension answers the call. The conference call is made between the V-MSC4 622, V-MSC5 624, and the calling party A subscriber in step 770. The person taking the call may press a "special code" keypad button to accept the call and activate a selected function code in step 780. After this, the order to release the other extension communication unit, in this case extension 626, is placed in step 790. The final connection between the A subscriber and the correct B-extension 628 (via V-MSC5 624) is maintained in step 800.

Although the invention has been described with reference to specific embodiments, this description is not meant to be construed in a limited sense. The various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A method for establishing a call connection between a calling party number and a plurality of extension units associated with a particular called party number within a mobile telecommunication network, comprising the steps of:
   associating a plurality of mobile identification numbers (MINs) identifying a plurality of extension units with a particular called party number;
   receiving a call connection from said calling party number towards said called party number;
   identifying said plurality of MINs associated with said called party number; paging said plurality of extension units identified by said MINs in an attempt to route said call connection;
   receiving a response from two or more of said paged extension units;
   establishing call connections between said called party number and said responded extension units;
   receiving an indication from one of the responded extension units to maintain an exclusive communication link with said calling party number; and
   disconnecting, in response to said indication, said call connections with other responded extension units.

2. The method of claim 1 further comprising the steps of:
   associating a plurality of subscriber directory numbers for each of said MINs; and
   wherein said step of paging further comprises the step of determining whether said calling party number is identified as one of said subscriber directory numbers associated with each of said MINs, and
   in the event none of the subscriber directory numbers for any of said plurality of MINs matches said calling party number, paging said extension units identified by all of said plurality of MINs; otherwise, paging only those extension units with a match between said subscriber directory numbers and said calling party number.

3. The method of claim 1 wherein said step of establishing said call connections further comprises the steps of:
   starting a timer for a specific time duration for receiving a response from one or more of said extension units;
   establishing said call connections with said calling party number if a response from a particular extension unit is received before said timer expires; otherwise,
   denying said call connection for said particular extension unit.

4. The method of claim 1 wherein said step of paging further comprises the steps of:
   generating a first ring tone to all of said plurality of extension units;
   determining that a call connection has been successfully established with one of the extension units; and
   generating a second ring tone to all other plurality of extension units to indicate that a particular one of said extension units have responded to the page and has established the call connection.

5. An apparatus for establishing a call connection between a calling party number and a plurality of extension units associated with a particular called party number within a mobile telecommunication network, comprising:
   means for associating a plurality of mobile identification numbers (MINs) identifying a plurality of extension units with a particular called party number;
   means for receiving a call connection from said calling party number towards said called party number;
   means for identifying said plurality of MINs associated with said called party number;
   means for paging said plurality of extension units identified by said MINs in an attempt to route said call connection;
   means for receiving a response from two or more of said paged extension units;
   means for establishing call connections between said called party number and said responded extension units;
   means for receiving an indication from one of the responded extension units to maintain an exclusive communication link with said calling party number; and
   means for disconnecting, in response to said indication, said call connections with other responded extension units.

6. The apparatus of claim 5 further comprising:
   means for associating a plurality of subscriber directory numbers for each of said MINs;
   wherein said means for paging further comprises means for determining whether said calling party number is identified as one of said subscriber directory numbers associated with each of said MINs, and
   paging said extension units identified by all of said plurality of MINs in the event none of the subscriber directory numbers for any of said plurality of MINs matches said calling party number; otherwise, paging only those extension units with a match between said subscriber directory numbers and said calling party number.

7. The apparatus of claim 5 wherein said means for establishing said call connections further comprises:

means for starting a timer for a specific time duration for receiving a response from one or more of said extension units;

means for establishing said call connections with said calling party number if a response from a particular extension unit is received before said timer expires; otherwise, means for denying said call connection for said particular extension unit.

8. The apparatus of claim 5 wherein said means for paging further comprises:

means for generating a first ring tone to all of said plurality of extension units;

means for determining that a call connection has been successfully established with one of the extension units; and means for generating a second ring tone to all other plurality of extension units to indicate that a particular one of said extension units have responded to the page and has established the call connection.

* * * * *